(12) United States Patent
Sawada et al.

(10) Patent No.: US 12,260,330 B2
(45) Date of Patent: *Mar. 25, 2025

(54) LEARNING APPARATUS, LEARNING METHOD, INFERENCE APPARATUS, INFERENCE METHOD, AND RECORDING MEDIUM

(71) Applicant: NEC Corporation, Tokyo (JP)

(72) Inventors: Azusa Sawada, Tokyo (JP); Soma Shiraishi, Tokyo (JP); Takashi Shibata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 399 days.

This patent is subject to a terminal disclaimer.

(21) Appl. No.: 17/640,926

(22) PCT Filed: Sep. 20, 2019

(86) PCT No.: PCT/JP2019/037007
§ 371 (c)(1),
(2) Date: Mar. 7, 2022

(87) PCT Pub. No.: WO2021/053815
PCT Pub. Date: Mar. 25, 2021

(65) Prior Publication Data
US 2022/0335291 A1  Oct. 20, 2022

(51) Int. Cl.
*G06V 10/771* (2022.01)
*G06N 3/08* (2023.01)
*G06V 10/77* (2022.01)
*G06V 10/82* (2022.01)

(52) U.S. Cl.
CPC ............. *G06N 3/08* (2013.01); *G06V 10/771* (2022.01); *G06V 10/7715* (2022.01); *G06V 10/82* (2022.01)

(58) Field of Classification Search
CPC ........ G06N 3/08; G06N 3/045; G06V 10/771; G06V 10/7715; G06V 10/82; G06T 7/00
See application file for complete search history.

(56) References Cited

U.S. PATENT DOCUMENTS

2010/0142821 A1   6/2010 Hosoi
2017/0206465 A1*  7/2017 Jin ...................... G06F 16/5866
2024/0112447 A1*  4/2024 Sawada ..................... G06T 7/00

FOREIGN PATENT DOCUMENTS

CN      106803063 A   *  6/2017
JP      2011039831 A  *  2/2011
WO      2008/126790 A1   10/2008

OTHER PUBLICATIONS

U.S. Appl. No. 17/768,597, filed Apr. 4, 2024, Sawada; Azusa.*

(Continued)

*Primary Examiner* — Huo Long Chen

(57) ABSTRACT

A learning apparatus includes a metric space learning unit and a case example storage unit. The metric space learning unit learns a metric space including feature vectors extracted from sets of attribute-attached image data for each combination of different attributes by using the sets of attribute-attached image data to which pieces of attribute information are added. The case example storage unit calculates feature vectors from sets of case example image data, and stores the feature vectors as case examples associated with the metric space.

8 Claims, 8 Drawing Sheets

(56) References Cited

OTHER PUBLICATIONS

International Search Report for PCT Application No. PCT/JP2019/037007, mailed on Dec. 10, 2019.
Karen Simonyan et al., "Very Deep Convolutional Networks for Large-Scale Image Recognition", Published as a conference paper at ICLR 2015, pp. 1-14.
Matsukawa et al., "Person Re-Identification Using CNN Features Learned from Combination of Attributes", Proceedings of the 2016 23rd International Conference on Pattern Recognition (ICPR), Dec. 8, 2016, pp. 2428-2433.
Lampert, C. H. et al., "Learning to Detect Unseen Object Classes by Between-Class Attribute Transfer", Proceedings of the 2009 IEEE Conference on Computer Vision and Pattern Recognition, Jun. 25, 2009, pp. 951-958.
JP Office Action for JP Application No. 2021-546155, mailed on Jul. 25, 2023 with English Translation.
Nakano et al.,"Co-occurrence Attributes of Physical and Adhered Human Characteristics to Improve Person Re identification", Jan. 1, 2017, vol. J100-D and No. 1, pp. 104-114., SSN: A 1881-0225, Japan.
Sakurai et al,"A Speed-up Method of the Contrastive Loss for Deep Metric Learning", the 31st time of Japanese Society for Artificial Intelligence nationalconference collected papers [DVD-ROM], Session-ID: 3Q1-12inch1, May 25, 2017, pp. 1-pp. 4., Japan.
Ueda et al,"A Study on Nearest Neighbor Classifier Using Adaptive Distance Learning", FIT2011 10th Information Science and Technology Forum Proceedings, vol. 2, Information Processing Society of Japan, Aug. 22, 2011, No. 429-432 pages, Japan.

* cited by examiner

LEARNING APPARATUS, LEARNING METHOD, INFERENCE APPARATUS, INFERENCE METHOD, AND RECORDING MEDIUM

This application is a National Stage Entry of PCT/JP2019/037007 filed on Sep. 20, 2019, the contents of all of which are incorporated herein by reference, in their entirety.

TECHNICAL FIELD

The present disclosure relates to a technique for recognizing an object included in an image.

BACKGROUND ART

An object recognition technique for recognizing a target object in an image acquired by an imaging device such as a camera is known. For example, Patent Document 1 and Non-Patent Document 1 describe an object recognition technique for performing learning and recognition using a neural network.

In the learning in the object recognition technique described above, a recognition model is trained so that an image of an object belonging to any one of categories (registration categories) registered in advance as a recognition target is input to a predetermined recognition model, and a recognition score for the category to which the object belongs becomes higher. In a case where an image of an object which category is unknown is input to a learned recognition model after the recognition model is trained, the recognition score is output for each of the registration categories from the recognition model described above. Moreover, Non-Patent Document 1 also describes a point in which a predetermined threshold value is provided with respect to the recognition score, and when the recognition score falls below the above threshold value, a recognition result is rejected as an object of the registration category that could not be detected.

PRECEDING TECHNICAL REFERENCES

Patent Document

[Patent Document 1] International Publication No. WO2008/126790

Non-Patent Document

[Non-Patent Document 1] Karen Simomyan and Andrew Zisserman, "Very Deep Convolutional Networks for Large-Scale Image Recognition" ICLR, 2015.

SUMMARY

Problem to be Solved

However, the above-described method only rejects a recognition target of an unregistered category and cannot be recognized. Moreover, a recognition performance significantly reduced except for a domain (environment) of an image used in learning.

It is one object of the present disclosure to correspond to images acquired in various environments, and to be able to output a recognition result for a recognition target of an unregistered category.

Means for Solving the Problem

In order to solve the above problems, according to an example aspect of the present disclosure, there is provided a learning apparatus including:
  a metric space learning unit configured to learn, for each combination of different attributes, a metric space including feature vectors which are extracted from sets of attribute-attached image data to which pieces of attribute information are respectively added, by using the sets of attribute-attached image data; and
  a case example storage unit configured to calculate feature vectors from sets of case example image data and store the calculated feature vectors as case examples associated with the metric space.

According to another example aspect of the present disclosure, there is provided a learning method including:
  learning, for each combination of different attributes, a metric space including feature vectors which are extracted from sets of attribute-attached image data to which pieces of attribute information are respectively added, by using the sets of attribute-attached image data; and
  calculating feature vectors from sets of case example image data and storing the calculated feature vectors as case examples associated with the metric space.

According to still another example aspect of the present disclosure, there is provided a recording medium storing a program, the program causing a computer to perform a process including:
  learning a metric space including feature vectors, which are extracted from sets of attribute-attached image data, for each combination of different attributes by using the sets of attribute-attached image data to which pieces of attribute information are respectively added; and
  calculating feature vectors from sets of case example image data and storing the calculated feature vectors as case examples associated with the metric space.

According to a further example aspect of the present disclosure, there is provided an inference apparatus including:
  learning, for each combination of different attributes, a metric space including feature vectors which are extracted from sets of attribute-attached image data to which pieces of attribute information are respectively added, by using the sets of attribute-attached image data; and
  calculating feature vectors from sets of case example image data and storing the calculated feature vectors as case examples associated with the metric space.

According to a still further example aspect of the present disclosure, there is provided an inference method, including:
  acquiring a plurality of metric spaces from a case example storage unit that stores feature vectors of sets of case example image data as case examples by associating with the plurality of metric spaces, which are learned for each combination of different attributes;
  selecting one metric space by evaluating the plurality of metric spaces using a feature vector of selection image data; and
  recognizing inference image data based on feature vectors extracted from the inference image data and case examples associated with the one metric space, and outputting a recognition result.

According to a yet further example aspect of the present disclosure, there is provided a recording medium storing a program, the program causing a computer to perform a process including:

acquiring a plurality of metric spaces from a case example storage unit that stores feature vectors of sets of case example image data as case examples by associating with the plurality of metric spaces, which are learned for each combination of different attributes;

selecting one metric space by evaluating the plurality of metric spaces using a feature vector of selection image data; and recognizing inference image data based on feature vectors extracted from the inference image data and case examples associated with the one metric space, and outputting a recognition result.

Effect

According to the present disclosure, corresponding to images acquired in various environments, it is possible be able to output a recognition result for a recognition target of an unregistered category.

EXAMPLE EMBODIMENTS

In the following, example embodiments will be described with reference to the accompanying drawings.

[Basic Principle]

First, a basic principle of an object recognition method for the example embodiments will be described. In the present example embodiments, in addition to classes previously recognized as targets (hereinafter, referred to as "existing classes"), in a case of recognizing a new class (hereinafter, referred to as "new class"), case data, in which a case corresponding to the new class is registered (hereinafter, also referred to as "case example dictionary"), are created, and a target of the new class is recognized by referring to the case example dictionary. Moreover, regarding recognition objects of the existing classes, in order to prevent decrease of recognition accuracy in a new environment, a plurality of metric spaces are prepared and recognition is carried out using an optimum metric space.

(1) Creating a Case Example Dictionary

Figure 1:
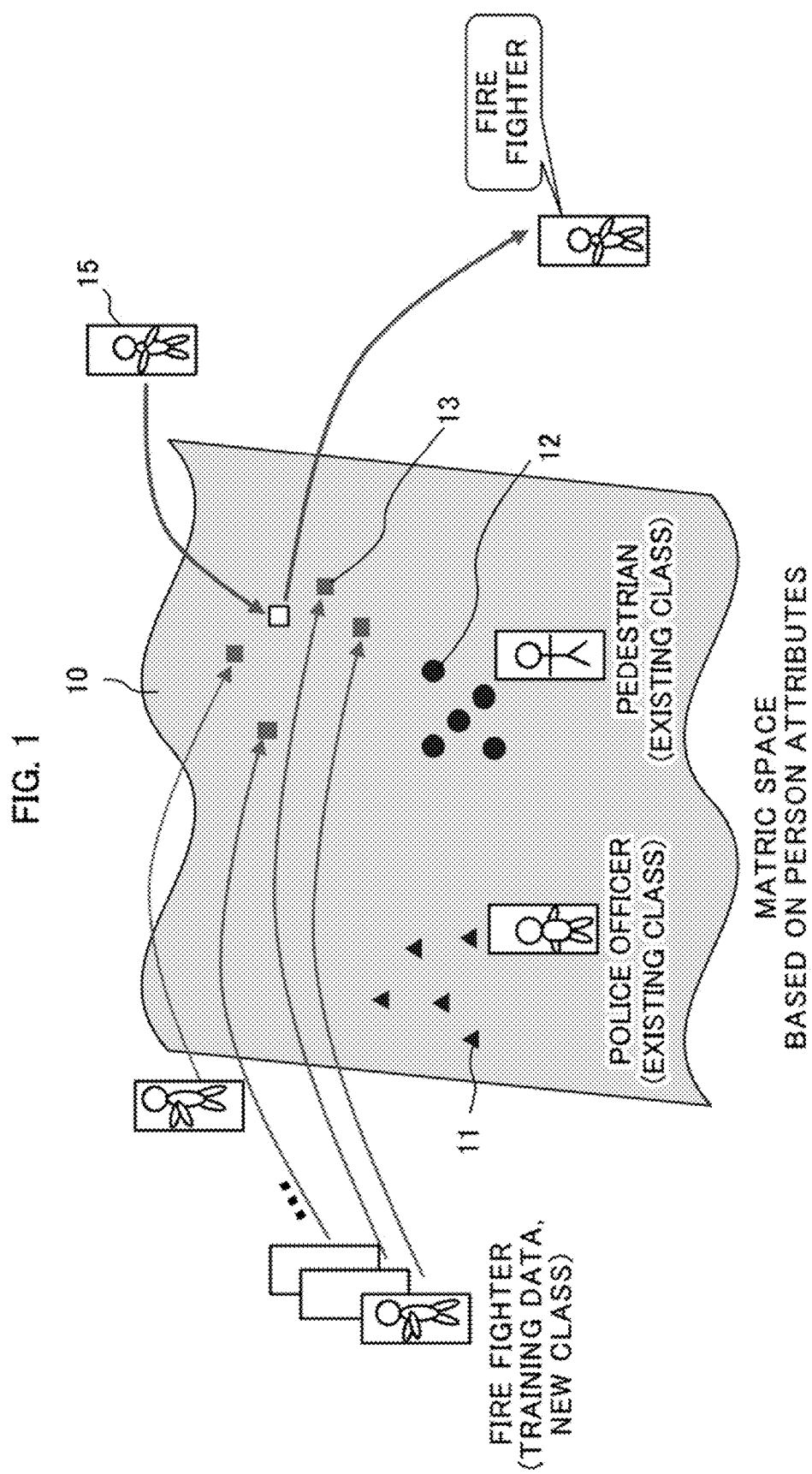
FIG. 1 is a diagram for explaining a method for creating the case example dictionary for recognition targets including a new class.

FIG. 1 illustrates a method for creating the case example dictionary for recognition targets including a new class. It is assumed that there are "police officer" and "pedestrian" as the existing classes, and that it is desired to identify a "fire fighter" as a new class. First, the metric space is learned using image data in which attribute information and the like are added. Specifically, image data of a person, to which the attribute information is added, are acquired using a public image data set or the like of various persons. Incidentally, "attribute information" may indicate a person attribute appearing in the image data, for instance, age, gender, height, and an incidental item (such as a belonging or an item worn) of the person. In the example illustrated in FIG. 1, image data of various attributes are acquired for the "police officer", the "pedestrian" and the "fire fighter" to be recognition targets.

Next, the metric space (distance space) is learned using the acquired image data. FIG. 1 illustrates a metric space 10 which is learned based on a specific person attribute. The metric space 10 is a space defined by a feature vector (metric) extracted from the image data, and is formed so as to have a property in which sets of similar image data are located at a short distance and sets of dissimilar image data are located at a long distance. Specifically, a public image dataset of persons having a specific person attribute (for instance, wearing a hat) is acquired, feature vectors are calculated for them, and the metric space is learned based on the obtained feature vectors. Note that "learning the metric space" actually refers to preparing a recognition model using a neural network or the like, and training the model so that the feature vectors generated by the model with respect to an input of each set of image data have the above properties. Also, the metric space obtained by learning will be specified by parameters of the trained recognition model.

Upon completion of learning of the metric space, feature vectors are then generated from sets of image data of the existing classes and embedded as case examples in the metric space 10. In the metric space 10, since sets of similar mage data are located close to each other, as illustrated, sets of image data for the existing class "police officer" are located close to each other in the metric space 10 as indicated by marks 11, and sets of the image data for the existing class "pedestrian" are located close to each other in the metric space 10 as indicated by marks 12. On the other hand, "police officers" indicated by the marks 11 and "pedestrians" indicated by the marks 12 are located apart from each other in the metric space 10. Thus, the sets of the image data for the existing classes are embedded as case examples in the metric space 10. Note that "embedded as a case example" actually refers to storing feature vectors extracted from an image in association with the metric space 10.

Next, for the new class, case examples are similarly embedded in the metric space 10. Specifically, feature vectors are extracted from sets of image data for the new class "fire fighter" and embedded as the case examples in the metric space 10. By this process, as indicated by marks 13, the sets of the image data for the new class "fire fighter" are arranged close to each other in the metric space 10, and are located apart from other classes "police officer" and "pedestrian". Accordingly, in the metric space 10, case examples in the same class are located close to each other and case examples in different classes are located apart from each other.

Accordingly, when case examples are embedded in the metric space 10, it becomes possible to identify a class of image data with reference to these case examples. For instance, as illustrated in FIG. 1, when image data 15 of a certain person are input, a feature vector of the image data 15 is extracted to calculate a position in the metric space 10. In an example of FIG. 1, since the feature vector of the image data 15 belongs to a region where the case examples of the class "fire fighter" are gathered, the class of that image data can be identified as "fire fighter". As described above, even if a new class is added as a recognition target, the new class can be identified by creating the case example dictionary by embedding the existing classes and a new class in the metric space.

Note that FIG. 1 illustrates one metric space learned for a certain person attribute, in a practice, for each of multiple combinations of different person attributes, the metric space 10 is learned, and a case example is embedded in the learned metric space 10, so that a case example dictionary is created. Case examples concerning a plurality of metric spaces are registered in the case example dictionary. In the case example dictionary, the case examples in the plurality of metric spaces are registered.

(2) Inference Using Case Example Dictionary

Figure 2:
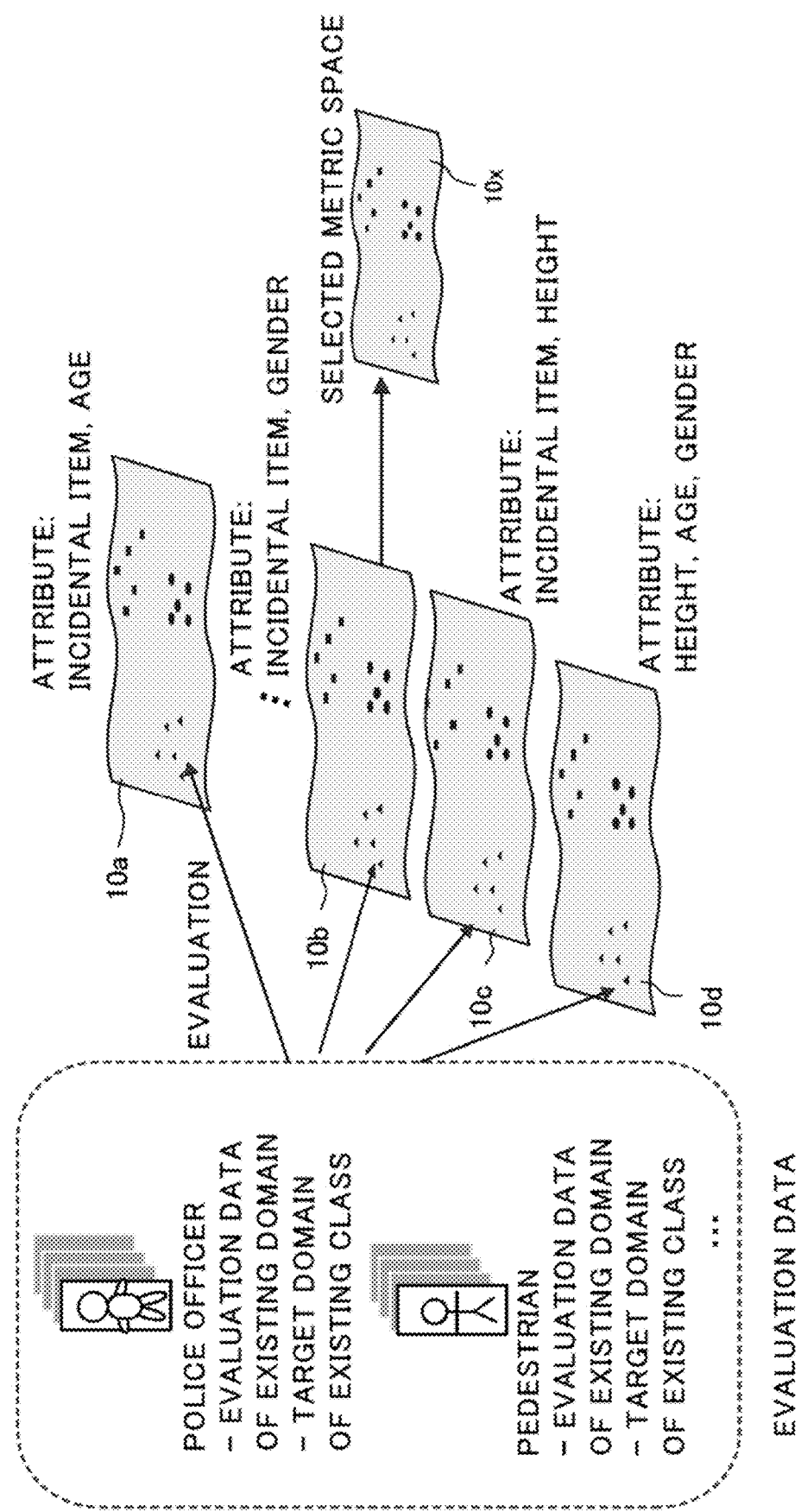
FIG. 2 is a diagram for explaining a method for selecting an optimum metric space.

In a case of conducting an object recognition using the created case example dictionary, a metric space most suitable for an environment (domain) at that time is selected, and the object recognition is carried out using that metric space. FIG. 2 is a diagram for explaining a method for selecting an optimum metric space. As described above, the case example dictionary includes case examples for a plurality of metric spaces corresponding to combinations of different person attributes. Now, as illustrated in FIG. 2, it is assumed that, in the case example dictionary, case examples are stored for each of metric spaces: a metric space 10a for attributes "incidental item" and "age", a metric space 10b for attributes "incidental item" and "gender", a metric space 10c for attributes "incidental item" and "height", and a metric space 10d for attributes "height", "age", and "gender".

Here, in order to select an optimum metric space, these metric spaces 10a through 10d are evaluated using multiple case examples of existing classes. In an example of FIG. 2, as evaluation data, evaluation data of an existing domain (source domain) and a small amount of data for a target domain of the existing class "police officer" are prepared, and the evaluation data of the existing domain (source domain) and a small amount of data for a target domain of the existing class "pedestrian" are prepared. Training labels such as class information are prepared for these sets of evaluation data. Regarding these sets of evaluation data, a recognition process is performed with reference to case examples of each of the metric spaces 10a to 10d, each result is compared with the training labels prepared in advance, and a degree of matching is calculated. Next, a metric space having a highest degree of matching is selected as an optimum metric space 10x. As described above, by selecting an optimum metric space from a plurality of metric spaces, it is possible to improve a recognition accuracy in a target domain. Incidentally, as an actual process, by using a recognition model that defines the selected metric space, image data of a target domain are recognized.

First Example Embodiment

Next, a first example embodiment in the present disclosure will be described.
(Hardware Configuration)

Figure 3:
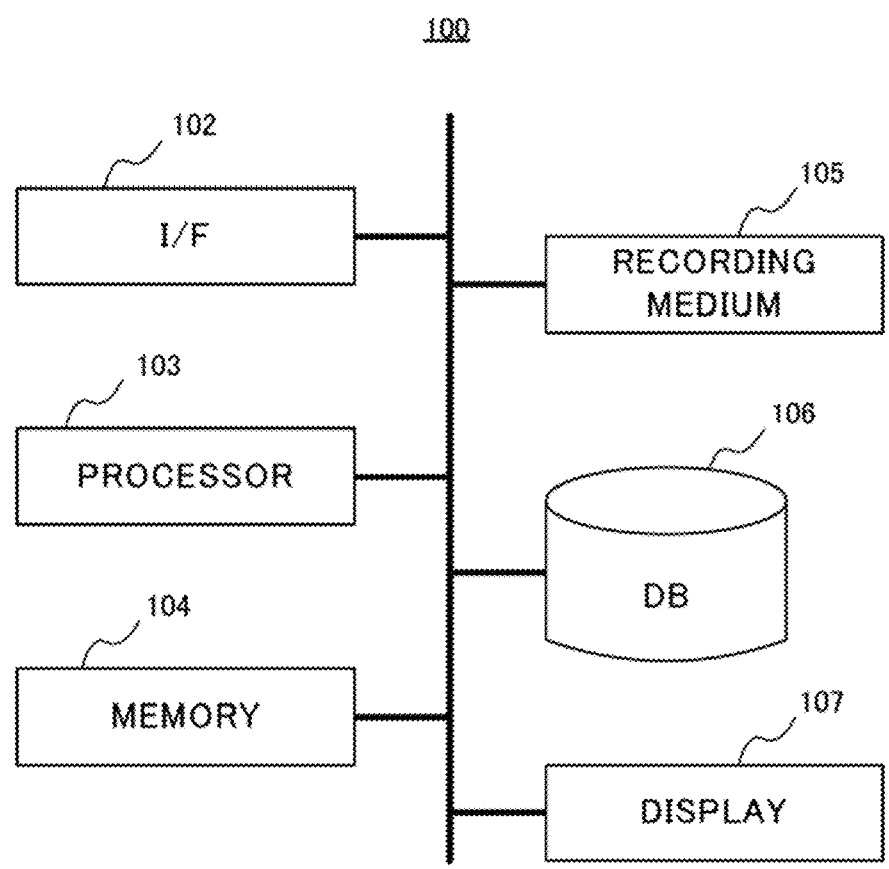
FIG. 3 is a block diagram illustrating a hardware configuration of an object recognition apparatus according to a first example embodiment.

FIG. 3 is a block diagram illustrating a hardware configuration of an object recognition apparatus according to a first example embodiment. As illustrated, the object recognition apparatus 100 includes an interface 102, a processor 103, a memory 104, a recording medium 105, a database (DB) 106, and a display 107.

The interface 102 inputs and outputs data to and from an external apparatus. Specifically, the image data used for learning or inferring by the object recognition apparatus 100 are input through the interface 102, and a recognition result of the object recognition apparatus 100 is output to the external apparatus through the interface 102.

The processor 103 is a computer such as a CPU (Central Processing Unit), a GPU (Graphics Processing Unit) with the CPU, or the like, and controls the entire object recognition apparatus 100 by executing a program prepared in advance. Specifically, the processor 103 executes a learning process and an inference process which will be described later.

The memory 104 is formed by a ROM (Read Only Memory), a RAM (Random Access Memory), or the like. The memory 104 stores a model for an object recognition used by object recognition apparatus 100. The memory 104 stores various programs to be executed by processor 103. The memory 104 is also used as a work memory during executions of various processes by the processor 103.

The recording medium 105 is a non-volatile and non-transitory recording medium such as a disk-shaped recording medium or a semiconductor memory, and is formed to be detachable from the object recognition apparatus 100. The recording medium 105 records various programs executed by the processor 103. When the object recognition apparatus 100 performs various kinds of processes, programs recorded on the recording medium 105 are loaded into the memory 104 and executed by the processor 103.

The database 106 stores externally input image data. Specifically, image data or the like used for learning of the object recognition apparatus 100 are stored. Also, the database 106 stores the case example dictionary created by the learning process. The display 107 is, for instance, a liquid crystal display apparatus, and displays a recognition result by the object recognition apparatus 100, additional information related to the recognition result, and the like. In addition to the above, the object recognition apparatus 100 may include an input apparatus such as a keyboard, a mouse, or the like for a user to conduct instructions and inputs.

(Function Configuration for Learning)

Figure 4:
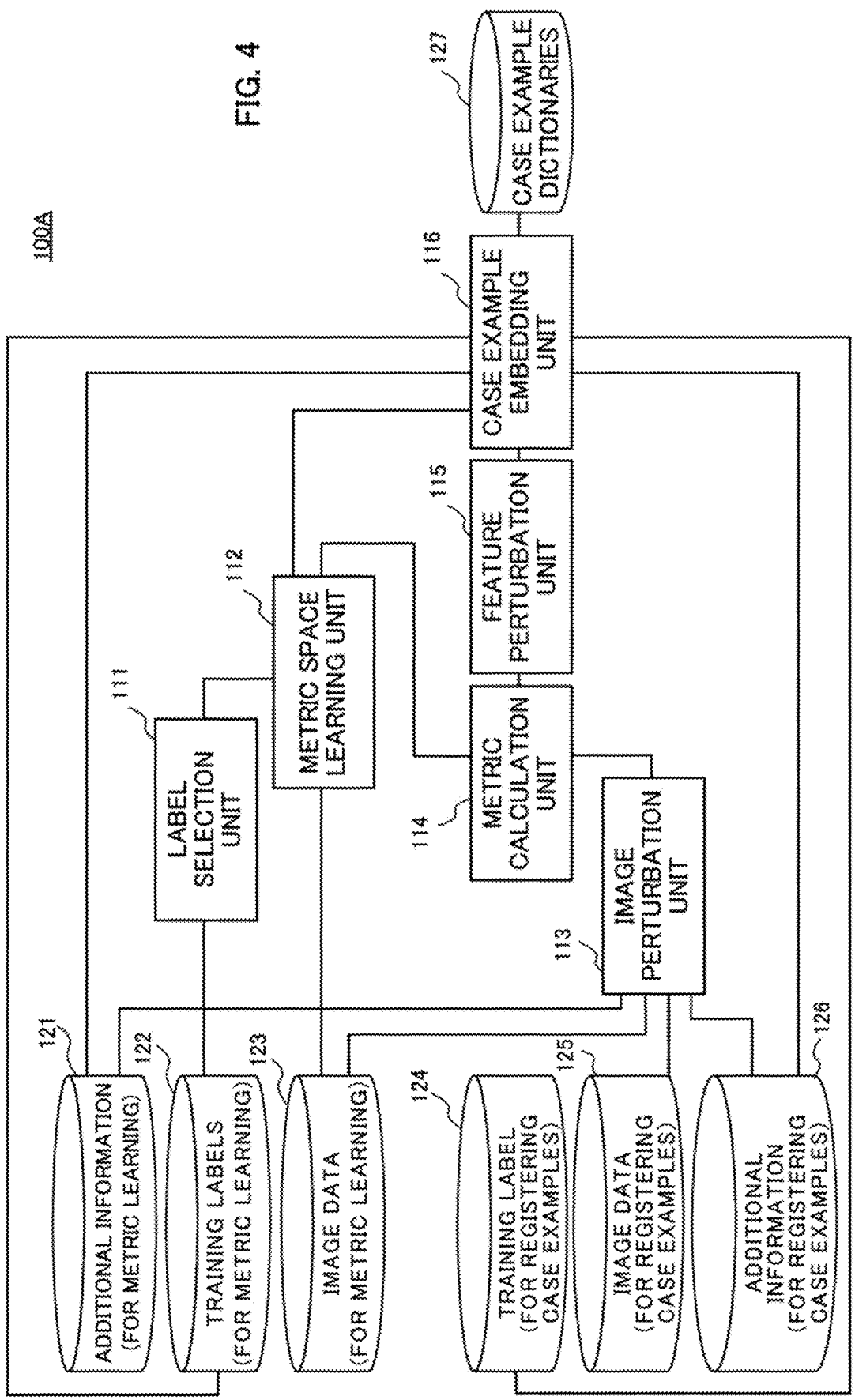
FIG. 4 is a block diagram illustrating a functional configuration of an object recognition apparatus for learning.

Next, a functional configuration for learning of the object recognition apparatus 100 will be described. FIG. 4 is a block diagram illustrating a functional configuration of an object recognition apparatus 100A for learning. As illustrated, the object recognition apparatus 100A includes a label selection unit 111, a metric space learning unit 112, an image perturbation unit 113, a metric calculation unit 114, a feature perturbation unit 115, and a case example embedding unit 116.

Additional information 121, training labels 122, and image data 123 are input as data for metric learning to the object recognition apparatus 100A. Incidentally, "data for metric learning" are data for learning a metric space. The image data 123 are image data for learning which are necessary to learn the metric space, and for instance, the aforementioned public image data set or the like can be used. The training labels 122 is a training label associated with the image data 123, and is, for instance, attribute information or class information of a person. Here, as the attribute information, an age, a gender, a height, an incidental item, clothing, and the like are recorded, and as the class information, personal ID, occupation (police officer, fire fighter), and the like are recorded. As the additional information 121 is information which is added as the additional information to assist in understanding of the information when registering the image data 123 and the training labels 122. Examples of the additional information 121 include a photographing time, information such as a depression angle of a camera used for photographing, environmental information (an air temperature, a latitude and longitude, an indoor/outdoor), and the like. As will be described later, the image data 123 and the training labels 122 for metric learning are also used for a case example registration as necessary.

Moreover, as data for registering case examples, a training label 124, the image data 125, and the additional information 126 are input to the object recognition apparatus 100A. The "data for registering case examples" are data for creating a case example dictionary. The image data 125 are image data for learning necessary for registering case examples, and the image data are prepared for each class to be identified. The training label 124 is a training label associated with the image data 125, and is for instance, class information or the like. The additional information 126 is information that is added as additional information to assist in understanding the image data 125 and the training label 124 when registering the image data 125 and the training label 124. As examples of the additional information 126, the photographing time, information such as a depression angle of a camera used for photographing, environmental information (an air temperature, a latitude and longitude, an indoor/outdoor), and the like.

In a case of learning the metric space, the label selection unit 111 selects a training label indicating an attribute or the like from the training labels 122. As a selection method, the label selection unit 111 may randomly select a plurality of training labels, or may select a plurality of training labels so that the training labels selected using an information entropy or the like become complementary information. The label selection unit 111 outputs a set of combinations of the selected training labels to the metric space learning unit 112. The label selection unit 111 is an example of an attribute determination unit in the present disclosure.

The metric space learning unit 112 learns the metric space based on the image data 123 for metric learning and the training labels selected by the label selection unit 111. Specifically, the metric space learning unit 112 learns a distance space in which each class of the training labels selected by the label selection unit 111 can be best identified. That is, as illustrated in FIG. 1, the metric space learning unit 112 learns the metric space such that case examples of the same class gather nearby and case examples of different classes are located apart. In practice, in a recognition model in which a feature is extracted from image data by convolution and is identified, a feature vector, which is obtained at a stage just before a final recognition is performed, may be used as a metric. For instance, a feature vector may be used that is obtained in a fully connected layer in a model of CNN (Convolutional Neural Network), such as VGG. The metric space learned in the above-described process is output to the metric calculation unit 114 and the case example embedding unit 116. In practice, parameters of the learned recognition model are output as a metric space.

The image data 123 and the additional information 121 for metric learning, and the image data 125 and the additional information 126 for registering case examples are input to the image perturbation unit 113. Here, the image data 123 for metric learning input to the image perturbation unit 113 are used to register case examples. The image perturbation unit 113 perturbs the image data 123 for metric learning and the image data 125 for registering case examples. Specifically, the image perturbation unit 113 applies an adversary perturbation to an original image by a geometric deformation, an image compression, an addition of blur or noise, a change in brightness, saturation, or the like. In a case where parameters of the perturbation can be estimated by the additional information, the image perturbation unit 113 may perturb an image only within ranges of these parameters. For instance, in a case where the parameters of the geometric deformation can be estimated from a depression angle of a camera included in the additional information, the image perturbation unit 113 may perform the geometric deformation within the ranges of the parameters. By the image perturbation, the number of sets of image data used for learning can be substantially increased. The perturbed image data are output to the metric calculation unit 114.

The metric calculation unit 114 is provided with the metric space learned from the metric space learning unit 112, and the perturbed image data are input from the image perturbation unit 113 to the metric calculation unit 114. The metric calculation unit 114 calculates a feature vector corresponding to a metric from the perturbed image data. That is, the metric calculation unit 114 calculates a position of each case example in the metric space learned by the metric space learning unit 112, regarding each set of the perturbed image data as a case example. By this process, the image data 125 for registering a case example are disposed in the metric space as illustrated in FIG. 1. In practice, the metric space learning unit 112 extracts a feature vector from each set of the perturbed image data by using the recognition model indicating the metric space learned by the metric space learning unit 112. The feature vector extracted from each set of the perturbed image data is output to the feature perturbation unit 115.

The feature perturbation unit 115 perturbs the feature vector of each set of the image data obtained by the metric calculation unit 114. That is, the feature perturbation unit 115 generates, as a new case example, a feature vector that exists at the farthest distance in the metric space within a certain range of a change in an image from among feature vectors of respective sets of image data obtained by the metric calculation unit 114. Accordingly, due to a plurality of case examples added around case examples disposed by the metric calculation unit 114 in the metric space, it is possible to extend a region of each class in the metric space. The feature perturbation unit 115 outputs, to the case example embedding unit 116, the feature vectors generated by the perturbation and the feature vectors before the perturbation, that is, the feature vectors which are input from the metric calculation unit 114.

The case example embedding unit 116 embeds, as case examples, the feature vectors input from the feature perturbation unit 115, that is, the feature vectors before and after the perturbation of features, into the metric space. Specifically, the case example embedding unit 116 associates the feature vectors input from the feature perturbation unit 115 as case examples with the metric space, and registers those feature vectors in the case example dictionary 127. At that time, the case example embedding unit 116 also registers the training labels 122 and 124 and the additional information 121 and 126 in association with respective case examples. Furthermore, the case example embedding unit 116 may register representative image data as image data corresponding to a case example to be embedded in the metric space. Thus, for each combination of a plurality of labels (attributes), the case example dictionary 127 is created in which case examples concerning a corresponding metric space are registered. Specifically, information defining a plurality of metric spaces and case examples embedded in each metric space are stored in the case example dictionary 127. Here, the "information defining a metric space" is actually parameters of the learned recognition model, and the "case examples embedded in each metric space" correspond to feature vectors in that metric space. Incidentally, the case example dictionary 127 is an example of a case example storage unit in the present disclosure.

(Learning Process)

Figure 5:
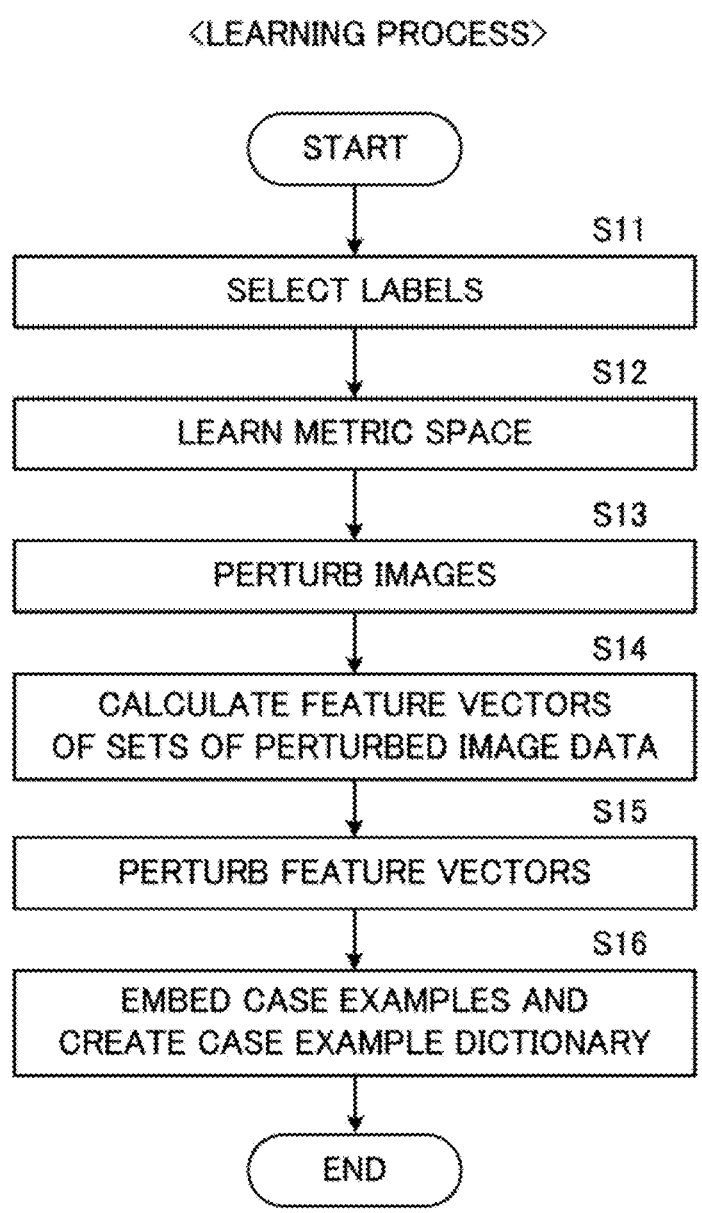
FIG. 5 is a flowchart of a learning process by the object recognition apparatus for learning.

Next, a flow of the above learning process will be described. FIG. 5 is a flowchart of the learning process by the object recognition apparatus 100A for learning. This process is implemented by the processor 103, which is illustrated in FIG. 3 and executes a pre-prepared program.

First, the label selection unit 111 selects training labels each including values of attributes and a class (step S11). The metric space learning unit 112 learns a metric space for each combination of the labels selected in step S11, by using the image data 123 for metric learning and the training labels 122 (step S12).

Next, the image perturbation unit 113 perturbs sets of the image data 125 for registering case examples and outputs sets of the perturbed image data to the metric calculation unit 114 (step S13). The metric calculation unit 114 calculates feature vectors of the sets of the perturbed image data (step S14), and the feature perturbation unit 115 perturbs the calculated feature vectors (step S15). Accordingly, by the perturbation of images and the perturbation of features, a plurality of feature vectors are provided from sets of image data for a registration. The case example embedding unit 116 creates the case example dictionary 127 by storing the obtained feature vectors as case examples in association with the metric space (step S16). Then, the learning process is terminated. Accordingly, for the metric space for one combination of attributes, the case examples are registered in the case example dictionary 127.

The label selecting unit 111 changes labels to select, and the object recognition apparatus 100A similarly learns a metric space for another combination of attributes, and embeds and registers case examples in the case example dictionary 127. Accordingly, as illustrated in FIG. 2, the case examples, which are disposed in the metric space corresponding to the combination of a plurality of attributes, are registered in the case example dictionary 127.

(Functional Configuration for Inference)

Figure 6:
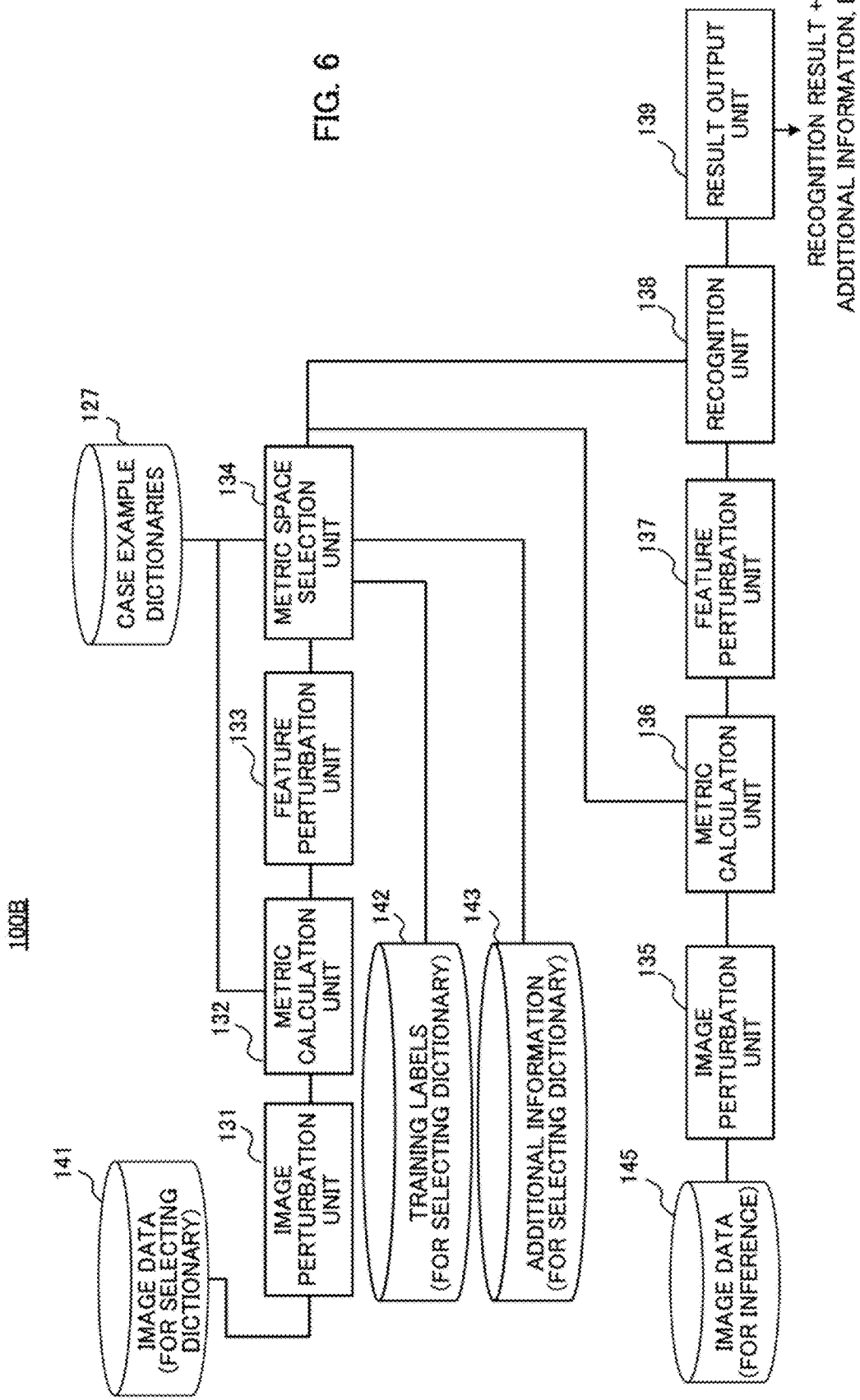
FIG. 6 is a block diagram illustrating a functional configuration of an object recognition apparatus for inference.

Next, a functional configuration for inference in the object recognition apparatus 100 will be described. FIG. 6 is a block diagram illustrating the functional configuration of an object recognition apparatus 100B for inference. As illustrated, the object recognition apparatus 100B includes an image perturbation unit 131, a metric calculation unit 132, a feature perturbation unit 133, a metric space selection unit 134, an image perturbation unit 135, a metric calculation unit 136, a feature perturbation unit 137, a recognition unit 138, and a result output unit 139.

The object recognition apparatus 100B uses image data 141 for selecting a dictionary, training labels 142 for selecting the dictionary, additional information 143 for selecting the dictionary, image data 145 for inference, and the case example dictionaries 127. Each case example dictionary 127 is created by the above-described learning process.

The image data 141 for selecting a dictionary are image data used to select one case example dictionary 127 corresponding to an optimum metric space from among case example dictionaries 127 prepared in advance for a plurality of metric spaces, and basic properties are the same as those of the image data 123 for learning a metric space described above. The training labels 142 for selecting a dictionary are training labels associated with the image data 141 for selecting a dictionary, and basic properties are the same as those of the training labels 122 for learning a metric space. The additional information 143 for selecting a dictionary is additional information associated with the image data 141 for selecting the dictionary, and basic properties are the same as those of the additional information 121 for learning a metric space. The image data for inference are image data to be recognized by the object recognition apparatus 100B.

Moreover, each of the image perturbation units 131 and 135 is the same as the image perturbation unit 113 in the functional configuration for learning illustrated in FIG. 4, each of the metric calculation units 132 and 136 are the same as the metric calculation unit 114 in the functional configuration for learning, and each of the feature perturbation units 133 and 137 are the same as the feature perturbation unit 115 in the functional configuration for learning.

In FIG. 6, the image perturbation unit 131, the metric calculation unit 132, the feature perturbation unit 133, and the metric space selection unit 134 perform a process for selecting an optimum metric space from a plurality of metric spaces stored in the case example dictionaries 127 using the image data 141 for selecting a dictionary, the training label 142, and the additional information 143. Specifically, the image perturbation unit 131 perturbs the image data 141 for selecting a dictionary. The metric calculation unit 132 first acquires one metric space from the plurality of metric spaces stored in the case example dictionaries 127, and calculates feature vectors of the perturbed image data in the metric space. Next, the feature perturbation unit 133 perturbs the feature vectors calculated by the metric calculation unit 132, and generates the perturbed feature vectors. Hence, a plurality of feature vectors are calculated from the image data 141 for selecting a dictionary. By this process, the number of sets of image data used to select an optimum metric space is increased.

The image perturbation unit 131, the metric calculation unit 132, and the feature perturbation unit 133 perform the same process with respect to other metric spaces, and calculate feature vectors in those metric spaces. Accordingly, for the plurality of metric spaces stored in the case example dictionaries 127, the plurality of feature vectors are calculated based on the image data 141 for selecting a dictionary.

The metric space selection unit 134 selects an optimum metric space from the feature vectors calculated based on the sets of the image data 141 for selecting a dictionary, a corresponding training label 142, and corresponding additional information 143. Specifically, the metric space selection unit 134 performs a performance evaluation for each metric space using a technique such as the nearest neighbor recognition among training labels, feature vectors of sets of the image data 141 for selecting a dictionary in the metric space, and feature vectors corresponding to case examples, which are embedded in the metric space and are stored in the case example dictionaries 127. That is, as illustrated in FIG. 2, the metric space selection unit 134 evaluates each performance of a plurality of metric spaces using sets of the image data for existing classes, and selects a metric space having the highest performance.

Furthermore, in a case where the metric space to be selected is restricted based on pieces of the additional information 143 for selecting dictionary, the metric space selection unit 134 may reduce the number of metric spaces in advance using the additional information 143, and then select an optimum metric space based on the above-described performance evaluation. Alternatively, a selection using the performance evaluation described above and a selection using the additional information may be conducted simultaneously. The metric space thus selected becomes a metric space that realizes the most accurate recognition with respect to attributes of the image data 141 for selecting a dictionary. The metric space selection unit 134 outputs the selected metric space to the metric calculation unit 136 and the recognition unit 138.

When an optimum metric space is selected, the inference is conducted with respect to the image data 145 for inference by using that metric space. The image perturbation unit 135 perturbs the image data 145 for inference, and outputs the perturbed image data to the metric calculation unit 136. The metric calculation unit 136 calculates a feature vector of the perturbed image data in the metric space selected by the metric space selection unit 134. Furthermore, the feature perturbation unit 137 perturbs the feature vector calculated by the metric calculation unit 136 and outputs a plurality of obtained feature vectors to the recognition unit 138.

The recognition unit 138 performs the nearest neighbor recognition or the like among the training labels, the plurality of feature vectors obtained from the image data 145 for inference, and a large number of case examples stored in the case example dictionary 127 regarding the metric space selected by the metric space selection unit 134 to identify a class of the image data 145 for inference. A recognition result is supplied to the result output unit 139.

In addition to the recognition result of the class by the recognition unit 138, the result output unit 139 outputs images corresponding to neighborhood case examples selected by the recognition unit 138, and training labels and pieces of additional information which are associated with the neighborhood case examples. Specifically, the result output unit 139 displays these pieces of information on the display unit 107 illustrated in FIG. 3. In this manner, even if a recognition target included in the image data 145 for inference corresponds to a new class, a user can view not only the class of the recognition result but also images, training labels, pieces of additional information, and the like related to case examples close to the recognition target, so that it is possible to intuitively determine the validity of the recognition result.

(Inference Process)

Figure 7:
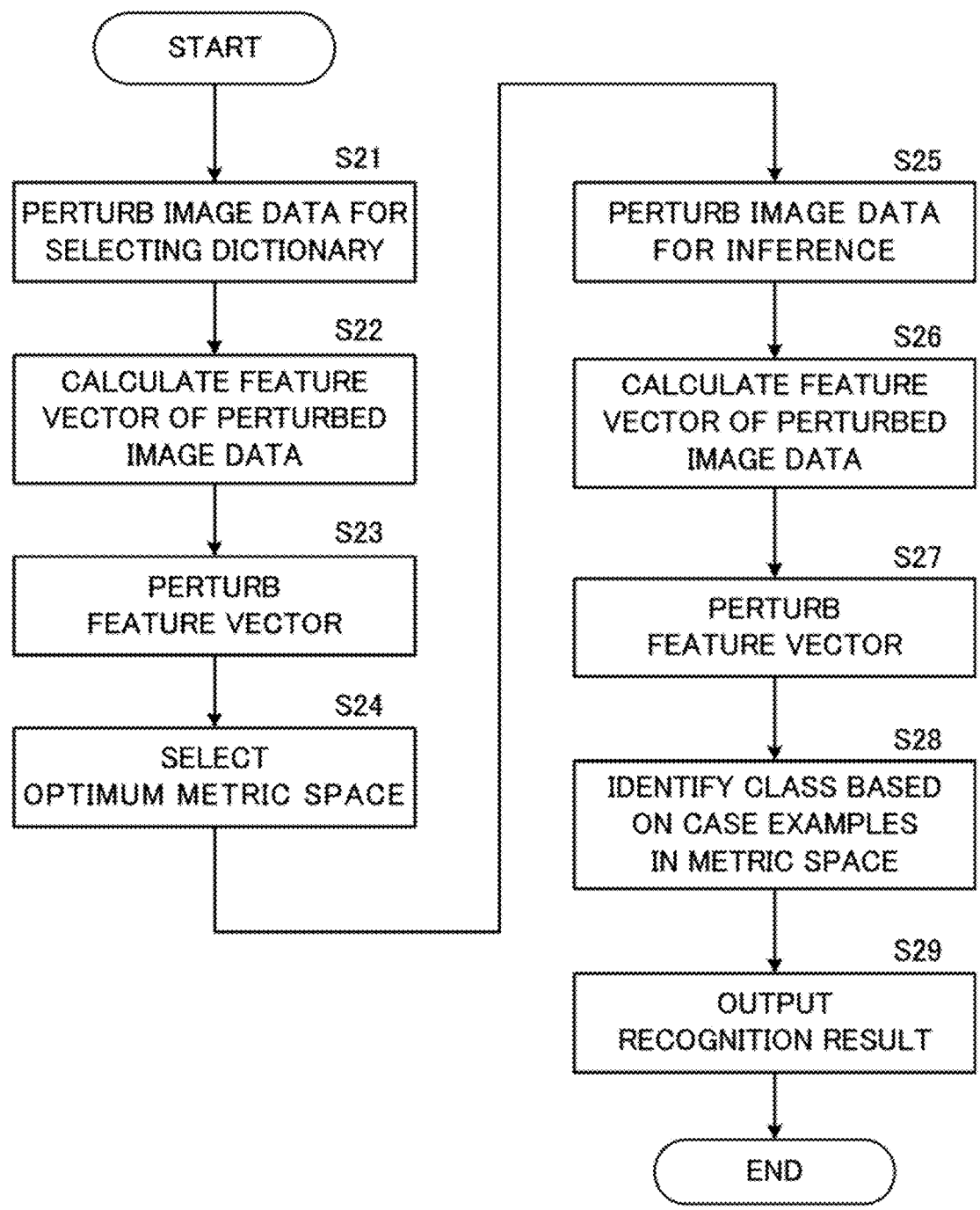
FIG. 7 is a flowchart of an inference process by the object recognition apparatus for inference.

Next, the inference process by the object recognition apparatus 100B for inference will be described. FIG. 7 is a flowchart of the inference process by the object recognition apparatus for inference. This process is performed by the processor 103, which is illustrated in FIG. 3 and executes a program prepared in advance.

First, the image perturbation unit 131 perturbs the image data 141 for selecting a dictionary (step S21), and the metric calculation unit 132 calculates each feature vector of the perturbed image data with respect to a plurality of metric spaces (step S22). Next, the feature perturbation unit 133 perturbs the obtained feature vectors to generate a plurality of perturbed feature vectors (step S23). After that, the metric space selection unit 134 performs a performance evaluation using the plurality of perturbed feature vectors and the case examples embedded in each of the metric spaces respective to the case example dictionaries 127, and selects an optimum metric space (step S24).

When the optimum metric space is thus selected, subsequently, a recognition is conducted on the image data 145 for inference. The image perturbation unit 135 perturbs the image data 145 for inference (step S25), and the metric calculation unit 136 calculates a feature vector of the perturbed image data for the metric space selected in step S24 (step S26). Next, the feature perturbation unit 137 perturbs the obtained feature vector to generate a perturbed feature vector (step S27), and the recognition unit 138 identifies a class by a technique such as the nearest neighbor recognition among case examples in the selected metric space (step S28). The result output unit 139 outputs a recognition result of the class together with sets of image data of the case examples which are used for the identification, the training labels, pieces of additional information, and the like (step S29). After that, the inference process is terminated.

(Modification)

(1) In the above inference process, the metric space selection unit 134 evaluates a plurality of metric spaces using image data of an existing class as evaluation data, and selects the optimum metric space. In addition to this process, the metric space selection unit 134 may use image data of a new class as evaluation data. In this case, it is conceivable that a correct label (correct class) is not prepared for the image data of the new class; however, even in that case, when a plurality of case examples of the new class form a bundle at a position apart from case examples of other existing classes on the metric space, it is possible to evaluate that the metric space has an appropriate performance. Therefore, a case example dictionary with the best features may be selected in which sets of feature vectors in a set of case examples of a new class to be a target gathered in a narrower region in the metric space is distanced further apart from other sets. More specifically, for instance, for each case example in the new class, a ratio of an average value A of distances among the case example and other case examples in the new class, and an average value B of distances among the case example and case examples in the existing classes may be obtained, and one metric space having a small ratio may be selected.

(2) In the above-described example embodiments, a metric space is learned using person attribute data (incidental item, age, and the like) and person class data (police officer, fire fighter, and the like). Instead, the metric space may be learned using the person attribute data alone, and the obtained metric space may be used as an initial value, and after re-learning (fine tuning) using the person class data, a performance may be evaluated and an optimum metric space is selected.

(3) In the above-described example embodiments, the metric space is learned based on the person attribute data and the person class data. In this case, weights in a neural network may be shared by both a person attribute identification task and a person class identification task. Specifically, in a case of conducting an optimization (learning of a metric space), weights may be set for a loss function of the person attribute identification task and a loss function of the person class identification task, and the learning is performed. For instance, for the loss function of the person attribute identification task and the loss function of the person class identification task, a contribution (coefficient) of either one loss function is increased in a first half of a re-proposed, and a contribution (coefficient) in that loss function is decreased in a second half of an optimization. By this method, since a model is acquired which can identify person attributes and can identify a person class, it is possible to expect an identification with a higher performance.

Moreover, since person attribute data can also be diverted, it is effective in a case where the number of sets of data for person classes is small. In general, public image data sets and the like contain a large number of sets of person attribute data; however, there is often the small number of sets of the person class data. Accordingly, the learning is started by increasing a weight for the loss function with respect to the person attribute identification task, and then the learning is performed by increasing a weight for the loss function of the person class identification task to specialize in each person class. By this method, even in a state where there are the large number of sets of person attribute data and there are the small number of sets of person class data, it is possible to effectively utilize the person class data to learn the metric space.

(4) In the above example embodiments, image data are perturbed by the image perturbation unit, the following method may be used as a method of an image perturbation. As a first method, each of images for a plurality of persons is decomposed into partial areas such as parts of a human body (a head, a torso, hands, feet, and the like), and these are pasted together to generate an image of a person. Incidentally, a boundary portion of a body part is subjected to an image process such as an alpha blending. As a second method, first, joint positions of a person body appearing in image data are detected by a key point detection. Next, a geometric transformation such as an affine transformation, a Helmart transformation, a homography transformation, B-spline interpolation, or the like is used to normalize positions of key points and to generate images with aligned joint positions. After that, the positions of the key points are shifted minutely by adding noises or the like, and a perturbation is applied.

Also, the feature perturbation unit may also generate micro-perturbation case examples using an adversary case example generation. Specifically, in a case of adding minute noise to an input image, a case example, which is the most distant from a group of case examples in the same class as a class to which a target case example belongs, is adopted. That is, a case example obtained by applying minute noises to the input image is adopted when the case example is far from existing case examples in the metric space, and the case example is not adopted when the case example is close to the existing case examples.

(5) In the above example embodiments, the image and the feature vector are perturbed in the learning of a metric space and the selection of a metric space; however, in a case where the sufficient number of sets of image data can be prepared, the perturbation of images and feature vectors may not be performed.

Second Example Embodiment

Figure 8A:
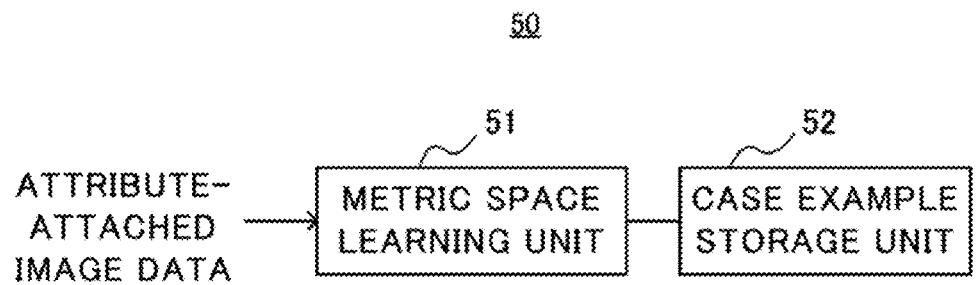
FIG. 8A and FIG. 8B are block diagrams illustrating configurations of a learning apparatus and an inference apparatus according to a second example embodiments.

Next, a second example embodiment of the present disclosure will be described. FIG. 8A illustrates a configuration of a learning apparatus 50 according to the second example embodiment. The learning apparatus 50 includes a metric space learning unit 51 and a case example storage unit 52. The metric space learning unit 51 learns a metric space including feature vectors extracted from attribute-attached image data for each combination of different attributes using the attribute-attached image data to which attribute information is added. The case example storage unit 52 calculates feature vectors from sets of case example image data, and stores the feature vectors as case examples associated with the metric space. Accordingly, for each combination of different attributes, a metric space is learned and the case examples are stored in association with the learned metric space.

Figure 8B:
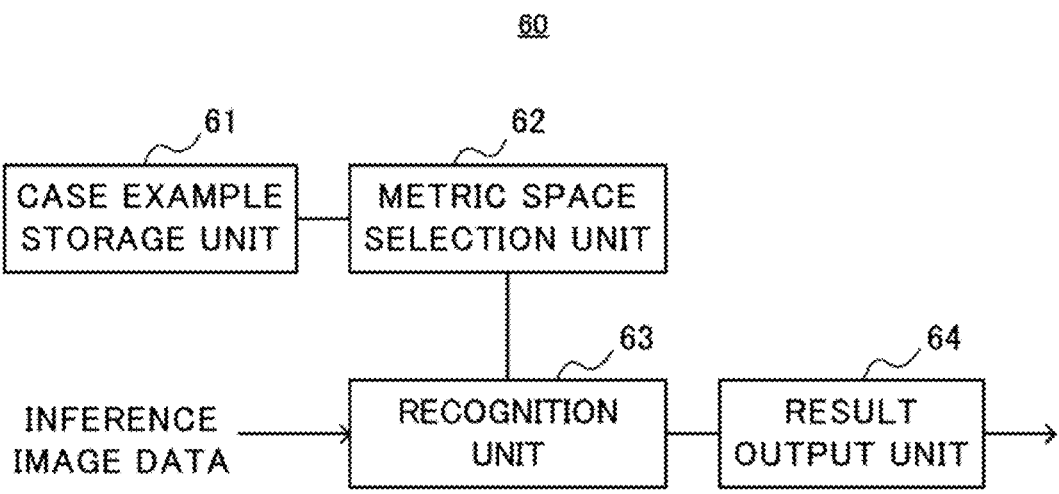

FIG. 8B illustrates a configuration of an inference apparatus according to the second example embodiment. The inference apparatus 60 includes a case example storage unit 61, a metric space selection unit 62, a recognition unit 63, and a result output unit 64. The case example storage unit 61 stores feature vectors of sets of case example image data as case examples in association with a plurality of metric spaces learned for each combination of different attributes. The metric space selection unit 62 evaluates the plurality of metric spaces using the feature vectors of the sets of selection image data, and selects one metric space. The recognition unit 63 recognizes inference image data based on feature vectors extracted from the inference image data and case examples associated with one metric space. Then, the result output unit 64 outputs a recognition result by the recognition unit 63. Accordingly, it is possible to identify the inference image data using the case examples stored in the case example storage unit 61.

A part or all of the example embodiments described above may also be described as the following supplementary notes, but not limited thereto.

(Supplementary Note 1)
A learning apparatus comprising:
a metric space learning unit configured to learn, for each combination of different attributes, a metric space including feature vectors which are extracted from sets of attribute-attached image data to which pieces of attribute information are respectively added, by using the sets of attribute-attached image data; and
a case example storage unit configured to calculate feature vectors from sets of case example image data and store the calculated feature vectors as case examples associated with the metric space.

(Supplementary Note 2)
The learning apparatus according to supplementary note 1, further comprising an attribute determination unit configured to determine each combination of different attributes.

(Supplementary Note 3)
The learning apparatus according to supplementary note 1 or 2, further comprising a first image perturbation unit configured to perturb each set of the case example image data,
wherein the case example storage unit stores feature vectors calculated from sets of perturbed case example image data as the case examples.

(Supplementary Note 4)
The learning apparatus according to any one of supplementary notes 1 through 3, further comprising a first perturbation unit configured to perturb the feature vectors calculated for the sets of case example image data,
wherein the case example storage unit stores the perturbed feature vectors as the case examples.

(Supplementary Note 5)
The learning apparatus according to any one of supplementary notes 1 through 4, wherein the case example storage unit stores training labels and pieces of additional information with respect to the sets of case example image data by associating with the case examples.

(Supplementary Note 6)
A learning method comprising:
learning, for each combination of different attributes, a metric space including feature vectors which are extracted from sets of attribute-attached image data to which pieces of attribute information are respectively added, by using the sets of attribute-attached image data; and calculating feature vectors from sets of case example image data and storing the calculated feature vectors as case examples associated with the metric space.

(Supplementary Note 7)

A recording medium storing a program, the program causing a computer to perform a process comprising:

learning, for each combination of different attributes, a metric space including feature vectors which are extracted from sets of attribute-attached image data to which pieces of attribute information are respectively added, by using the sets of attribute-attached image data; and calculating feature vectors from sets of case example image data and storing the calculated feature vectors as case examples associated with the metric space.

(Supplementary Note 8)

An inference apparatus comprising:

a case example storage unit configured to store feature vectors of sets of case example image data as case examples by associating with a plurality of metric spaces, which are learned for each combination of different attributes;

a metric space selection unit configured to select one metric space by evaluating the plurality of metric spaces using a feature vector of selection image data;

a recognition unit configured to recognize inference image data based on feature vectors extracted from the inference image data and case examples associated with the one metric space; and a result output unit configured to output a recognition result by the recognition unit.

(Supplementary Note 9)

The inference apparatus according to supplementary note 8, wherein the metric space selection unit identifies selection image data of an existing class by using each of the plurality of metric spaces and determines the one metric space having the highest degree of matching with respect to a training label for the selection image data of the existing class to be the one metric space.

(Supplementary Note 10)

The inference apparatus according to supplementary note 8 or 9, wherein the recognition unit determines, as the recognition result, a class of a case example which is the closest to the feature vector of the inference image data in the one metric space among the case examples stored in the case example storage unit.

(Supplementary Note 11)

The inference apparatus according to supplementary note 10, wherein the result output unit outputs, as an inference result, a training label, additional information, and image data of the closest case example, in addition to the recognition result.

(Supplementary Note 12)

The inference apparatus according to any one of supplementary notes 8 through 11, further comprising a second image perturbation unit configured to perturb the inference image data, wherein the recognition unit recognizes the inference image data using a feature vector of the perturbed inference image data.

(Supplementary Note 13)

The inference apparatus according to any one of supplementary notes 8 through 11, further comprising a second feature perturbation unit configured to perturb the feature vector of the inference image data, wherein the recognition unit recognizes the inference image data using the perturbed feature vector.

(Supplementary Note 14)

An inference method, comprising:

acquiring a plurality of metric spaces from a case example storage unit that stores feature vectors of sets of case example image data as case examples by associating with the plurality of metric spaces, which are learned for each combination of different attributes;

selecting one metric space by evaluating the plurality of metric spaces using a feature vector of selection image data; and recognizing inference image data based on feature vectors extracted from the inference image data and case examples associated with the one metric space, and outputting a recognition result.

(Supplementary Note 15)

A recording medium storing a program, the program causing a computer to perform a process comprising:

acquiring a plurality of metric spaces from a case example storage unit that stores feature vectors of sets of case example image data as case examples by associating with the plurality of metric spaces, which are learned for each combination of different attributes;

selecting one metric space by evaluating the plurality of metric spaces using a feature vector of selection image data; and recognizing inference image data based on feature vectors extracted from the inference image data and case examples associated with the one metric space, and outputting a recognition result.

While the disclosure has been described with reference to the example embodiments and examples, the disclosure is not limited to the above example embodiments and examples. It will be understood by those of ordinary skill in the art that various changes in form and details may be made therein without departing from the spirit and scope of the present disclosure as defined by the claims.

DESCRIPTION OF SYMBOLS

10 Metric space
100 Object recognition apparatus
103 Processor
111 Label selection unit
112 Metric space learning unit
113, 131, 135 Image perturbation unit
114, 132, 136 Metric calculation unit
115, 113, 136 Feature perturbation unit
116 Case example embedding unit
127 Case example dictionary
170 Terminal apparatus
138 Recognition unit
129 Result output unit

What is claimed is:

1. A system comprising a learning apparatus and an inference apparatus for using outputs from the learning apparatus, wherein the learning apparatus comprises:

a first memory storing first instructions; and one or more first processors configured to execute the first instructions to:

learn, for each of a plurality of combinations of different attributes, a metric space including feature vectors which are extracted from sets of attribute-attached image data to which pieces of attribute information are respectively added, by using the sets of attribute-attached image data, such that a plurality of the metric spaces are learned for the plurality of combinations of different attributes; and calculate, for each combination of different attributes, feature vectors from sets of case example image data and store the calculated feature vectors as case examples associated with the metric space in the first memory, and wherein the inference apparatus comprises:

a second memory storing second instructions; and one or more second processors configured to execute the second instructions to:

store, in the second memory and for each combination of different attributes, the feature vectors of the sets of case example image data as the case examples in association with the metric space learned for each combination of different attributes;

select one metric space by evaluating the plurality of metric spaces using a feature vector of selection image data;

recognize inference image data based on feature vectors extracted from the inference image data and the case examples associated with the one metric space; and output a recognition result.

2. The system according to claim 1, wherein the second processor identifies selection image data of an existing class by using each of the plurality of metric spaces and determines the one metric space having a highest degree of matching with respect to a training label for the selection image data of the existing class.

3. The system according to claim 1, wherein the second processor determines, as the recognition result, a class of the case example closest to the feature vectors of the inference image data in the one metric space among the case examples stored in the second memory.

4. The system according to claim 3, wherein the second processor outputs, as an inference result, a training label, additional information, and image data of the closest case example, in addition to outputting the recognition result.

5. The system according to claim 1, wherein the second processor is further configured to perturb the inference image data, and the second processor recognizes the inference image data using feature vectors of the perturbed inference image data.

6. The system according to claim 1, wherein the second processor is further configured to perturb the feature vectors of the inference image data, and the second processor recognizes the inference image data using the perturbed feature vectors.

7. A method performed by a system comprising a learning apparatus and an inference apparatus for using outputs from the learning apparatus, the method comprising:

by the learning apparatus:

learning, for each of a plurality of combinations of different attributes, a metric space including feature vectors which are extracted from sets of attribute-attached image data to which pieces of attribute information are respectively added, by using the sets of attribute-attached image data, such that a plurality of the metric spaces are learned for the plurality of combinations of different attributes; and calculating, for each combination of different attributes, feature vectors from sets of case example image data and store the calculated feature vectors as case examples associated with the metric space in a first memory of the learning apparatus, and by the inference apparatus:

storing, in a second memory of the inference apparatus and for each combination of different attributes, the feature vectors of the sets of case example image data as the case examples in association with the metric space learned for each combination of different attributes;

selecting one metric space by evaluating the plurality of metric spaces using a feature vector of selection image data;

recognizing inference image data based on feature vectors extracted from the inference image data and the case examples associated with the one metric space; and outputting a recognition result.

8. A non-transitory computer-readable recording medium storing a program executable by a system to perform processing, the system comprising a learning apparatus and an inference apparatus for using outputs from the learning apparatus, the processing comprising:

by the learning apparatus:

learning, for each of a plurality of combinations of different attributes, a metric space including feature vectors which are extracted from sets of attribute-attached image data to which pieces of attribute information are respectively added, by using the sets of attribute-attached image data, such that a plurality of the metric spaces are learned for the plurality of combinations of different attributes; and calculating, for each combination of different attributes, feature vectors from sets of case example image data and store the calculated feature vectors as case examples associated with the metric space in a first memory of the learning apparatus, and by the inference apparatus:

storing, in a second memory of the inference apparatus and for each combination of different attributes, the feature vectors of the sets of case example image data as the case examples in association with the metric space learned for each combination of different attributes;

selecting one metric space by evaluating the plurality of metric spaces using a feature vector of selection image data;

recognizing inference image data based on feature vectors extracted from the inference image data and the case examples associated with the one metric space; and outputting a recognition result.

* * * * *